(12) United States Patent
Sheridan (10) Patent No.: US 7,796,141 B2
(45) Date of Patent: Sep. 14, 2010

(54) PERSISTENT PORTAL (75) Inventor: Timothy M. Sheridan, P.O. Box 26416, Eugene, OR (US) 97402

(73) Assignee: Timothy M. Sheridan, Pueblo, CO (US)

( * ) Notice: Subject to any disclaimer, the term of this patent is extended or adjusted under 35 U.S.C. 154(b) by 1176 days.

(21) Appl. No.: 10/556,852

(22) PCT Filed: May 14, 2004

(86) PCT No.: PCT/US2004/015108

§ 371 (c)(1),
(2), (4) Date: Nov. 14, 2005

(87) PCT Pub. No.: WO2004/104982

PCT Pub. Date: Dec. 2, 2004

(65) Prior Publication Data

US 2006/0284892 A1 Dec. 21, 2006

Related U.S. Application Data (60) Provisional application No. 60/470,601, filed on May 14, 2003.

(51) Int. Cl.
G09G 5/00 (2006.01)
G06F 3/048 (2006.01)
(52) U.S. Cl. ...................... 345/660; 715/800
(58) Field of Classification Search ........... 345/661, 345/660; 715/800, 778, 792, 788
See application file for complete search history.

(56) References Cited

U.S. PATENT DOCUMENTS

| 6,018,332 | A | 1/2000 | Nason et al. |
| 6,133,799 | A * | 10/2000 | Favors et al. ............. 331/57 |
| 6,310,603 | B1 * | 10/2001 | Nason et al. ............. 715/856 |
| 6,330,010 | B1 * | 12/2001 | Nason et al. ............. 715/802 |
| 6,337,717 | B1 * | 1/2002 | Nason et al. ............. 348/567 |
| 6,393,469 | B1 | 5/2002 | Dozier et al. |
| 6,426,762 | B1 * | 7/2002 | Nason et al. ............. 715/788 |
| 6,433,799 | B1 | 8/2002 | Nason et al. |
| 6,437,809 | B1 * | 8/2002 | Nason et al. ............. 715/778 |
| 6,570,595 | B2 * | 5/2003 | Porter ............. 715/802 |
| 6,590,592 | B1 * | 7/2003 | Nason et al. ............. 715/778 |
| 6,593,945 | B1 * | 7/2003 | Nason et al. ............. 715/779 |
| 6,630,943 | B1 * | 10/2003 | Nason et al. ............. 715/746 |
| 6,639,613 | B1 * | 10/2003 | Nason et al. ............. 715/778 |
| 6,661,435 | B2 * | 12/2003 | Nason et al. ............. 715/778 |
| 6,677,964 | B1 * | 1/2004 | Nason et al. ............. 715/764 |
| 6,678,007 | B2 | 1/2004 | Nason et al. |

(Continued)

OTHER PUBLICATIONS

PCT International Search Report and PCT Written Opinion for International Application No. PCT/US04/15108, filed May 14, 2004, dated Oct. 7, 2004, 8 pages.
Captured screen shots of product images referenced in the background of U.S. Appl. No. 10/556,852, 5 pages.
Office Action dated Mar. 11, 2010 for corresponding Canadian patent application No. 2,537,229, 2 pages.

Primary Examiner—Ryan R Yang
(74) Attorney, Agent, or Firm—Ganz Law, P.C.

(57) ABSTRACT

A method of proportionally reducing the area of the operating system's active "desktop" display with all functions operational, then deploying and displaying a secondary graphical user interface (GUI) known as a "Persistent Portal" (PP) into the resulting blanked area.

22 Claims, 8 Drawing Sheets

Reduction of Desktop Display Area

U.S. PATENT DOCUMENTS

| | | | |
|---|---|---|---|
| 6,678,227 B1 * | 1/2004 | Kondo et al. | 369/47.33 |
| 6,686,936 B1 * | 2/2004 | Nason et al. | 715/778 |
| 6,717,596 B1 | 4/2004 | Nason et al. | |
| 6,727,596 B2 * | 4/2004 | Takabayashi et al. | 257/786 |
| 6,727,918 B1 * | 4/2004 | Nason | 715/791 |
| 6,828,991 B2 * | 12/2004 | Nason et al. | 715/778 |
| 6,892,359 B1 * | 5/2005 | Nason et al. | 715/788 |
| 7,180,511 B2 * | 2/2007 | Shigeta | 345/204 |
| 7,340,682 B2 * | 3/2008 | Nason et al. | 715/746 |
| 2002/0089523 A1 * | 7/2002 | Hodgkinson | 345/660 |

* cited by examiner

No PP Interface Present

FIG. 4

Reduction of Desktop Display Area

FIG . 3b - PERSISTENT BAR/BOX GUI   (Prior Art)

PERSISTENT PORTAL

TECHNICAL FIELD

The present invention relates to a graphical user interface rendered on the display for a computer system, the portal system receiving content available over a computer network and presenting it to users through the user interface and/or presenting features for users interact with content or applications.

BACKGROUND OF THE INVENTION

Graphical User Interfaces (GUI) are essential in facilitating access to applications, documents, files, and functions in virtually all modern operating systems and a computer's resident applications and documents. The early DOS operating systems were probably the only systems in use that did not rely on a GUI to facilitate user input and interactivity. Online GUI's are mostly resident to the web browser, e-mail program, or web pages. However, the persistent type of GUI that is used for web-related purposes and functions independent of web pages (usually for the purpose of facilitating specific functions such as displaying advertising banners, messages, audio and video streams, etc.) does not appear inside a conventional display window. (Examples: NetZero, PointCast, and other similar Push Technology web publishers; Nason et al., and U.S. Pat. No. 6,018,332, which is hereby incorporated by reference in its entirety. The most common characteristic of this type of GUI is that when they are deployed to the user's screen on a monitor, they display in the shape of a bar or box that cuts-off or covers a portion of the view of the desktop display. This process is 'subtractive' as it removes a portion of that view which was present prior to GUI deployment. In the 'desktop only' view and with no other windows open, this type of persistent GUI sits on top of the desktop display and will cover anything that was originally in that specific area of the desktop display. Most GUI's of this type can be moved to the top or bottom of the desktop display through user input. When resident application windows are open, the window will resize to fit whatever area is left unoccupied by the GUI. To view the part of the window that has been 'subtracted' from the normal full view, the system recognizes that the display window is smaller in either its horizontal or vertical dimension and, subsequently, responds by displaying a scroll bar used to scroll the lost image of the window's content into view.

Although there are differences in the appearance and functions of GUI's, this type of display always results in the same 'subtractive' effect on the desktop display view. This prompted a need for a different approach to the deployment and display of a GUI, especially when it carries with it a function that may require a long term or full time active and accessible presence to the user online and/or offline. The objective is to preserve the normal complete view of the desktop display by proportionally reducing it in an inwardly direction toward the center of the display, thus resulting in a slightly smaller size and area but with the entire desktop display proportionally in tact and operational. This reduction process results in a "blanked" area that, in the preferred embodiment, surrounds the reduced desktop display on up to all four sides of the screen. This creates an area to deploy and display a fully functional GUI as a Persistent Portal (PP) simultaneously with the desktop that, in the preferred embodiment, takes the shape of a frame wrapping entirely around the new desktop display. This is an "additive" process as it adds the graphics and functionality of the PP without subtracting any portion of the view or functionality of the operating system's desktop, resident applications, or documents.

SUMMARY OF THE INVENTION

This invention relates to, Graphical User Interfaces and the process of proportionally reducing the size and area of the operating system's desktop display area, still with fully functional controls providing access to resident applications and documents, and with the entire view of all desktop visual elements intact, then deploying and displaying a secondary graphical user interface known as a Persistent Portal (PP) interface to the resulting "blanked" area For purposes of this document, the graphical display system of the present invention may be referred to as the Persistent Portal ("PP"), the Persistent Portal interface, or the "EyePortal™". The active display area known as the "desktop" serves as the primary graphical user interface of the operating system (OS). It displays the OS toolbar, icons and graphical symbols that provide access to applications and documents. The normal area occupied by the desktop display is best described as the entire area inside, but not including the "overscan" border. The overscan border is the area of the screen that resides beyond the standard screen display area and is utilized as part of VGA, SVGA and XGA video systems for electron gun retracing and timing processes. Various resolution settings options for the video display known as "video modes" are made available to the user in the display control panel of the OS.

The PP interface is intended to co-reside and display simultaneously with the desktop display in any video mode setting. Because of its ability to reduce the size and area of the desktop display and wrap around or sit adjacent to the desktop display, the PP interface does not obstruct fill view of the desktop display, and does not impair access to, or use of, any normal control, function, feature or operation of the OS, or any resident applications and documents. The PP contains its own set of controls that are accessed by the user independent of the desktop display, task bar, or start menu controls. Said controls do not obstruct or interfere with normal features, functions, and operations of the OS, or any resident applications and documents. Responding to user input, said controls will interact with the OS to facilitate activation of features and functions of the OS and resident applications, as well as web-based functions and other functions that are proprietary to the PP program.

In a preferred embodiment, the desktop display area reduction process maintains the proportions of the original view within a margin of approximately plus or minus ten percent, or a proportion with no significant distorting visual effect on the reduced desktop display.

The foregoing embodiments and features are for illustrative purposes and are not intended to be limiting, persons skilled in the art being capable of appreciating other embodiments from the scope and spirit of the foregoing teachings.

BRIEF DESCRIPTION OF THE DRAWINGS

FIG. 10 shows a flowchart of one possible embodiment of a method according to the present invention.

DETAILED DESCRIPTION

Overview

Figure 3A:
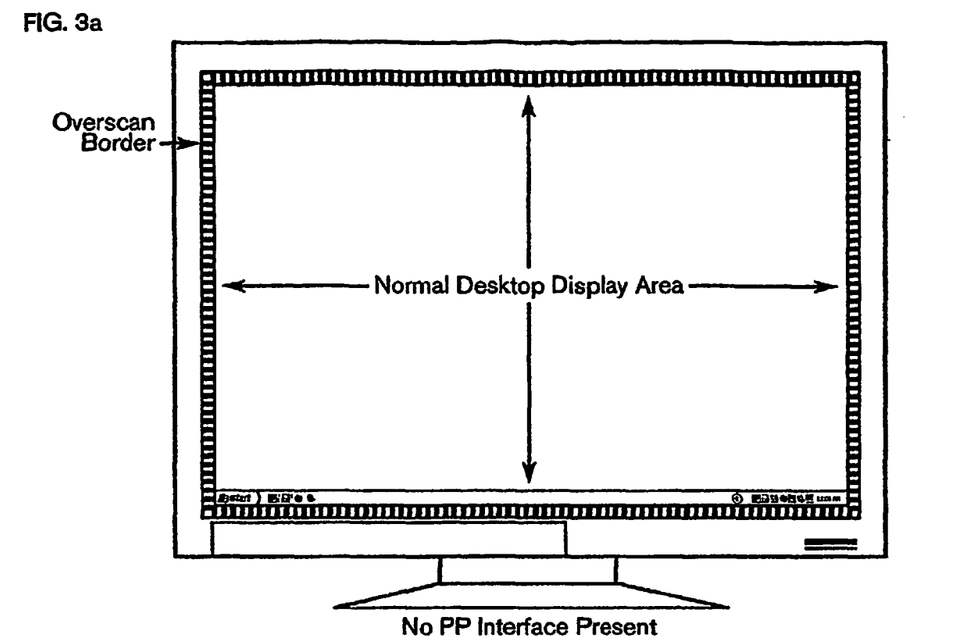
FIG. 3a shows an active content area for a typical computer display system.
Figure 3B:
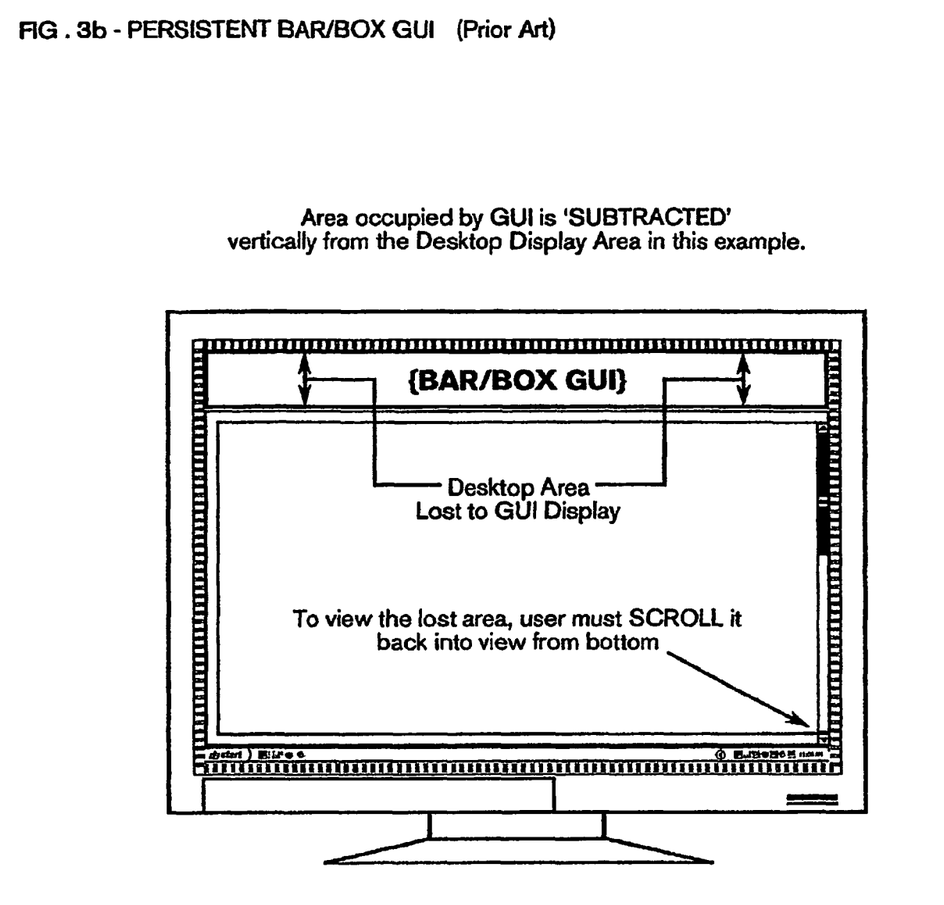
FIG. 3b shows a standard active content area of a computer display in the prior art.
Figure 4:
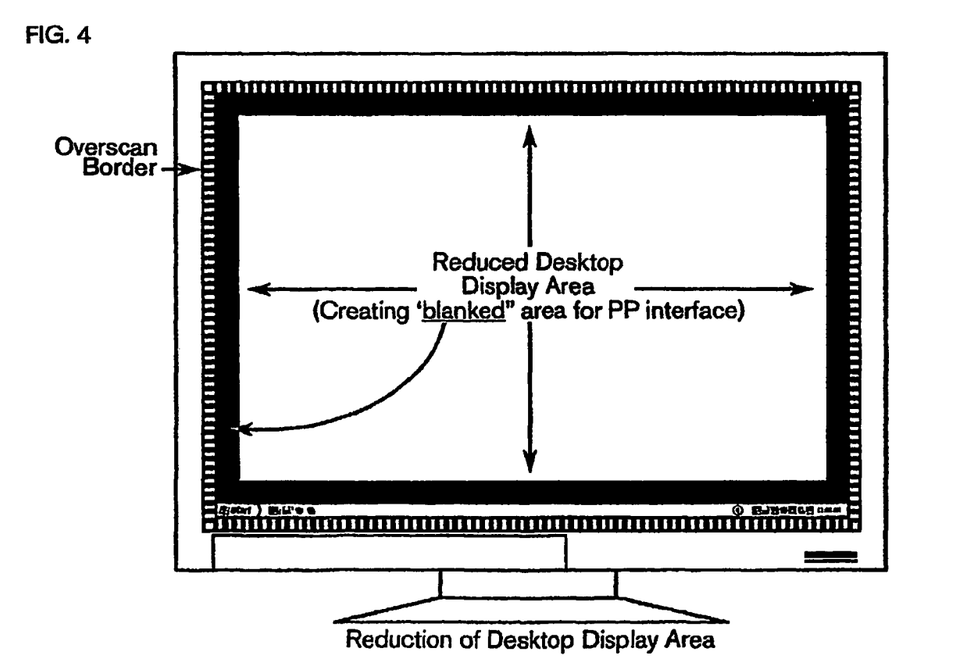
FIG. 4 shows a view of the active content area after it has been reduced for creating a PP interface according to the present invention.

The invention contemplates systems and methods relating to a "Persistent Portal" system that includes a GUI residing in a predetermined portion of the display area that is normally allocated to the desktop display or Active Content Area ("ACA") for a general purpose digital computing machine. The ACA, as illustrated in FIG. 3a, is best described as the entire display area inside of, but not including the overscan border, if the display generates such a border. The PP does not have a 'subtractive' effect on the view of the desktop or ACA (FIG. 3b), as is the case with current persistent GUI's. As shown in FIG. 4 (which is a display according to the present invention), everything that was in view in the desktop display prior to the deployment and subsequent display of the PP is still completely visible, intact, and all functions are operational. In addition to standard computer monitors, the PP may be used with televisions, closed circuit, and other types of monitors or screens such as those associated with cellular phones, PDA's (personal digital assistant), game units and other hand-held devices.

The interface of the present invention functions as a persistent portal (PP) facilitating fulltime access to hard drive based applications and documents, web-based resources and applications, and any peripheral that is normally available to the user when the PP is not present The PP interface may be visually displayed with a skin and graphical icons and elements that provide access to active controls, buttons, features, and functions defined by the custom feature sets and resident functions of the PP program. Feature sets and functions are the products of the PP operational mission and architecture (examples seen in FIG. 11.). As a direct result of the completion of the launch process described above, the PP becomes fully activated and all controls become accessible to user input and command interaction. The PP interface may include, but is not limited to buttons, menus, ticker, application controls, graphical elements and visuals including animations, multiple interface skin designs, and any element, device, or operation that facilitates action or response to user input The PP interfaces accomplishes all of this without impairment or obstruction of the normal operations of the computer and OS that would be expected if the PP interface were not present The net result of this invention's ability to display the PP interface as a secondary GUI simultaneously with the desktop without a 'subtractive' effect on the desktop display, is that all controls, icons, and graphical elements of the desktop display remain unobstructed with no loss of its cumulative display image, and all desktop controls and functions remain fully operational. A PP icon resides in the SysTray of the OS Task Bar, if present, and allows the user to hide or show the active PP GUI by clicking the icon.

The PP application may be used with Microsoft™ .NET FRAMEWORK on a user's local machine(s), and a computer with the Microsoft™ .NET FRAMEWORK will be used as the example for the purpose illustrating the present invention. However, the present invention is not intended to be limited to computers with the Microsoft™ .NET FRAMEWORK. (In certain embodiments, the PP application may be developed in Java, including the OSGi Java Framework (OSGi Service Platform), or for Linux, or fixture technologies/methodologies, in whole or in part, depending on the specific requirements of the client/publisher.)

Display Configuration of Persistent Portal Interface

The PP interface is rendered to occupy an area forming at least one zone at an outer edge of the viewable screen area while providing a proportional reduction of the desktop display area so that applications launched in the ACA are rendered in substantially their normal proportions. In the context of the invention, "substantially their normal proportion" and like terminology means that there can be some variation from normal proportionality but most users do not perceive that there is such variation. The zone or zones forming the PP interface include one or more modules. Each zone may represent, or include a set of modules representing, a particular theme, organizational or sponsorship scheme or theme, or a user customized or scheme theme. Each module may represent one or more features or functions, as is discussed in more details below.

Figure 5:
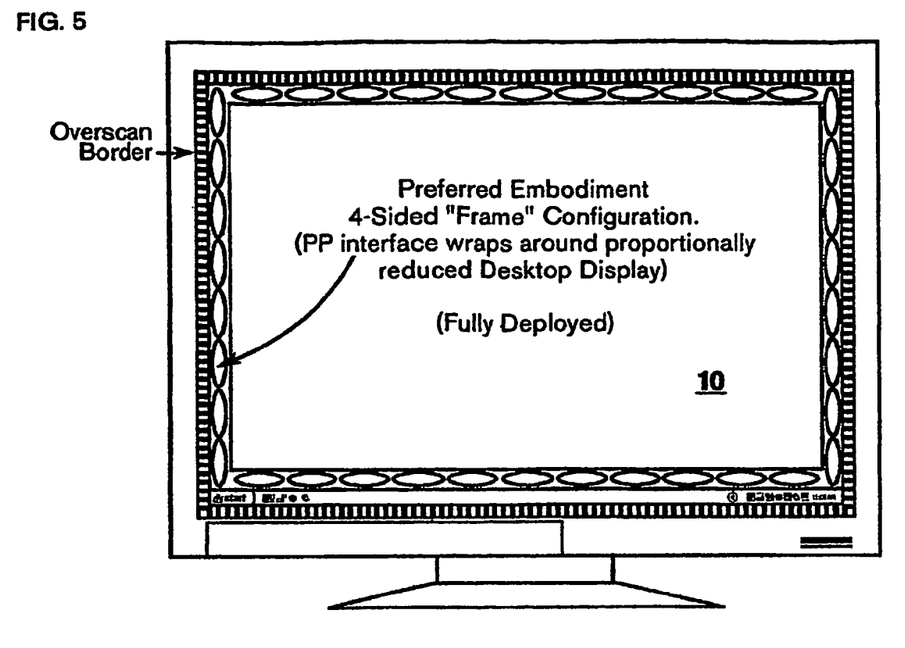
FIG. 5 shows one possible example of PP interface according to the present invention.

In an embodiment preferred by the inventor, one or more zones are arranged in the shape of a "frame" around the ACA in which the number of pixels reduced are both vertical and horizontal resulting in a blanked area at the top and bottom of the original desktop display area, and in which the number of pixels reduced is horizontal, resulting in a blanked area on the left outermost and right outermost sides of the original desktop display area. Because other resident application windows are designed to display within the same area defined by the desktop display, such application windows subsequently display within the reduced area left after framing, and in the same pre-reduction proportions. This is illustrated in FIG. 5, which shows the PP 10 interface according to the present invention as a frame with 4 sides around the reduced desktop display that are oriented to all 4 corners of the normal desktop display area This four-sided PP interface may be consist of a single zone or multiple zones, depending on the selection and arrangement of the modules populating the interface.

The specific area comprising the PP interface is determined by the PP operational mission protocol in which all custom features and functions are defined and integrated into the program. While this process allows for customized area requirements, the preferred embodiment sets the area occupied by the PP interface to a specific size measured in pixels, both vertical and horizontal in any video mode or screen resolution setting. Table 1 below shows example dimensions of the preferred embodiment (four-sided frame interface). Dimensions maintain a proportional accuracy of +/−10% of the original Desktop Display Area

TABLE 1

| Thickness of Interface Frame (fully deployed) | | | |
| --- | --- | --- | --- |
| TOP | BOTTOM | RIGHT | LEFT |
| 15 | 25 | 20 | 20 |

(NOTE: All numerical values are in pixels)

This example set of dimensions is suitable for most modern standard monitors featuring standard video mode resolution settings from 640×480 (lowest resolution) to 1920×1440 (highest resolution).

Zone size and shape may vary depending on how much of the display area is to be dedicated to PP features and functions. The PP may also have a different zone dimensions at one side versus another, while still substantially preserving proportionality in the area framed by the zone or zones. The PP interface may include modules or objects organized in one or more of the zones.

While the preferred embodiment of the PP is a four-sided frame as shown in FIG. 5, the PP interface may be configured in various ways to maintain substantially the proportions of the ACA. This principle is illustrated in the following examples.

Figure 6:
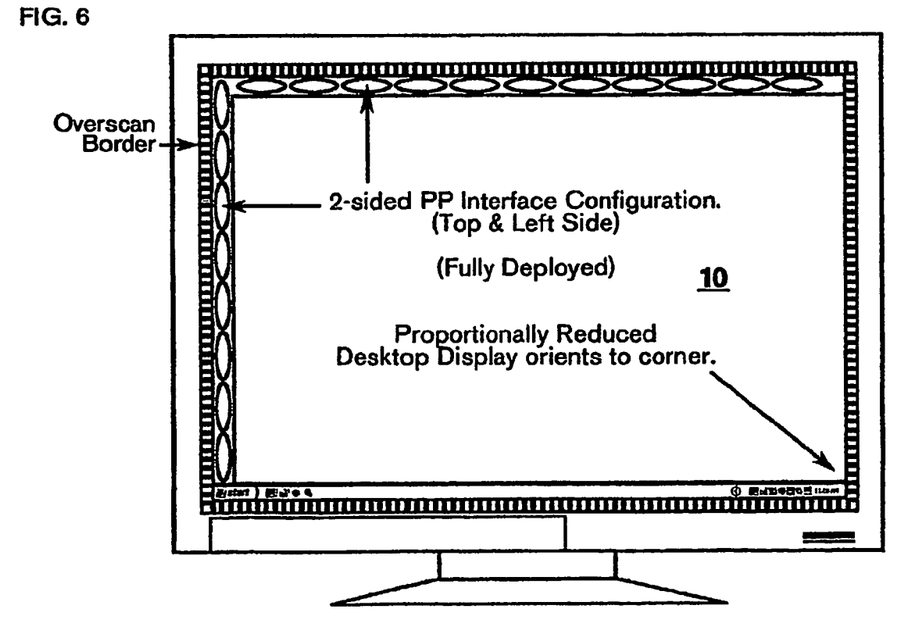
FIG. 6 shows another possible example of PP interface according to the present invention.

FIG. 6 shows the PP interface in an alternative embodiment configuration according to the present invention incorporating a use of at least 3 of the 4 corners of the desktop display area for displaying a 2-sided PP interface at the top and left sides of the display area, resulting in a proportional view of the new desktop display oriented to lower right corner of the display area.

Figure 7:
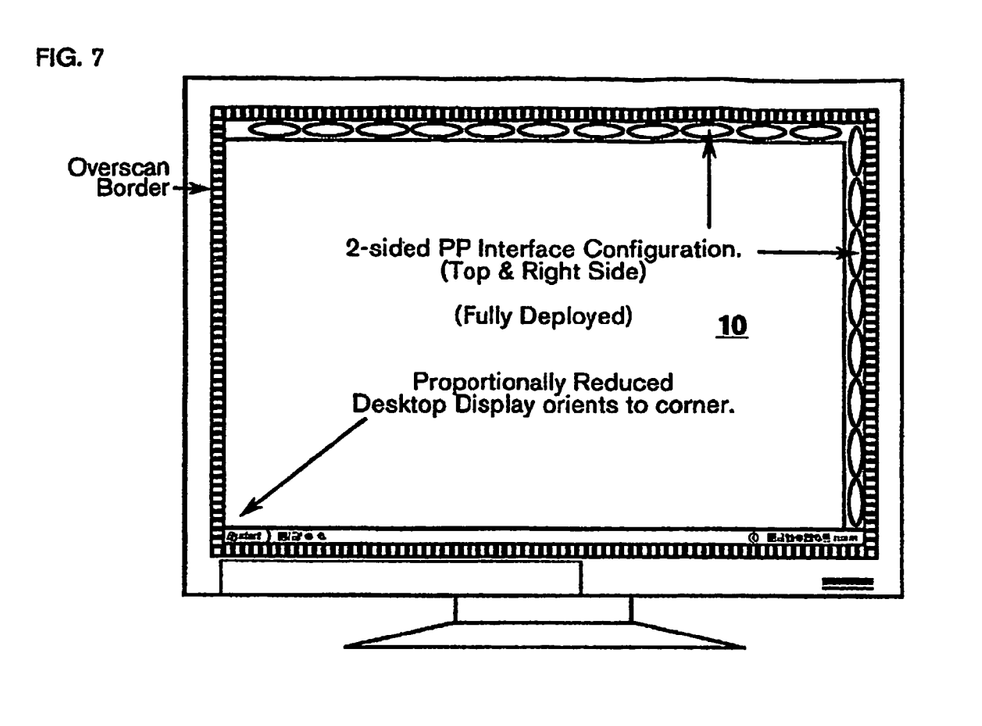
FIG. 7 shows another possible example of PP interface according to the present invention.

FIG. 7 shows the PP interface in an alternative embodiment configuration incorporating a use of at least 3 of the 4 corners of the desktop display area for displaying a 2-sided PP interface on the top and on the right sides of the display area, resulting in a proportional view of the new desktop display oriented to the bottom left corner of the normal display area.

Figure 8:
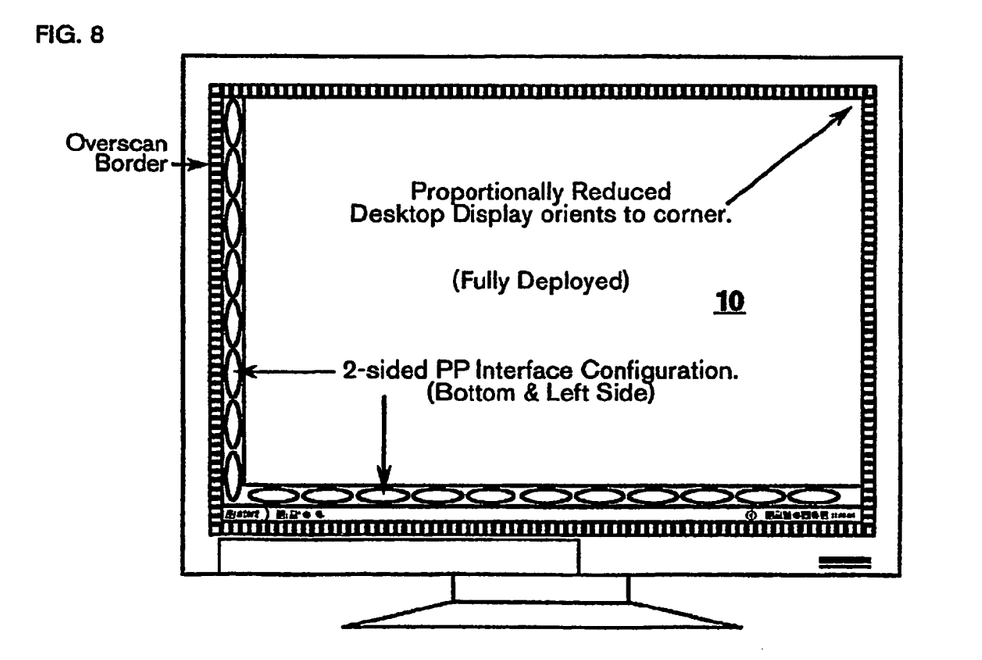
FIG. 8 shows another possible example of a PP interface according to the present invention.

FIG. 8 shows the PP interface in an alternative embodiment configuration incorporating a use of at least 3 of the 4 corners of the desktop display area for displaying a 2-sided PP interface on the left and bottom sides of the display area, resulting in a proportional view of the new desktop display oriented to the top right corner of the normal display area.

Figure 9:
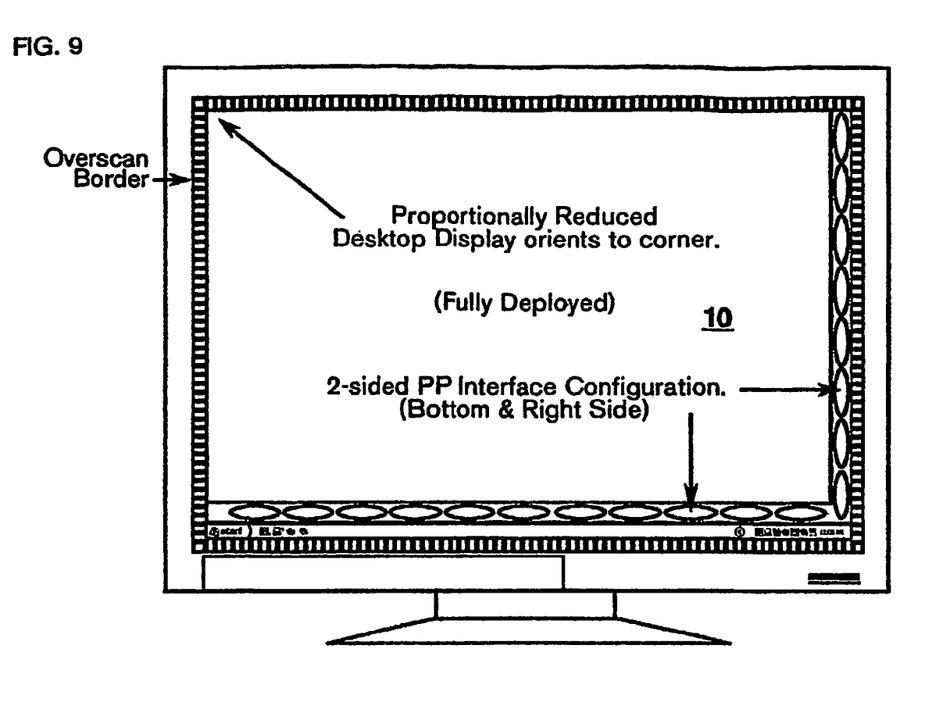
FIG. 9 shows another possible example of PP interface according to the present invention.

FIG. 9 shows the PP interface in an alternative embodiment configuration incorporating a use of at least 3 of the 4 corners of the desktop display area for displaying a 2-sided PP interface on the bottom and right sides of the display area resulting in a proportional view of the new desktop display oriented to the top left corner of the normal display area.

The PP 10 interface may in whole or part be configured to remain out of desktop view until some predetermined triggering event calls it into view. For example, the arrival of an email, news alert, ecommerce alert, change in stock price, etc., could all be triggering events.

In addition to the rectilinear shapes in the foregoing embodiment, in view of the teachings herein, persons skilled in the art will appreciate that the PP interface could also be rendered in other geometrical shapes, including curved and irregular shapes, by appropriate set of draw instructions executed during a launch process for the PP interface, as described below.

Modules

The PP may include a plurality of modules providing functions and features for users. The number, selection, arrangement, size and shape of icons and graphical representations for modules may be customized per mission or user requirements or objectives, so long as interactive or visual element for a module resides in the area dedicated to the PP interface.

The following objectives would apply in designing most PP interfaces: (1) providing fulltime, unobstructed access to any resident or web-based application, document or content that is intended for access by the publisher and the user, and (2) facilitating integration of custom functions as determined by user and publisher including, but not limited to the following examples:

Multi purpose ticker delivering proprietary or global ticker or crawler style messaging.

Delivery of and access to Alerts with priority recognition and targeted distribution by database management programs.

Access buttons that are links to global and proprietary content pages on the web.

Access buttons that launch resident or web-based applications as a result of user input.

Scheduled or random updating of content, features and functions.

Access buttons that are used for custom functions and features determined by user input, preference settings, or publisher options.

Delivery of video, audio and rich media content by integration of third party programs, applications, and services, and multiple channels of such content.

Delivery of co-branding programs and access to advertising/underwriter messages and displays.

Delivery of and access to communications programs such as third party IRC (instant messaging), voice over telephony, and proprietary communications programs.

Multiple PP content channel access wherein a user may select a different PP delivered channel through the current interface, by selecting the chosen alternative Channel icon from the PP selection control strip that causes the interface to re-deploy with the inventive interface, features and functions of the new channel selection.

Delivery of and access to interactive programs enabling special content and service offerings via computer, television (including proprietary and closed circuit systems), smart appliances, cellular phones, PDA's and other similar handheld devices.

Remote interactive communication and alert forwarding between the PP program residing on a users computer and the PP program residing on a cellular phone, PDA or other similar communication device.

Publishing And Content Delivery

The PP interface may be populated with zones and modules, with associated graphics and icons, using well-known programming techniques. Some such techniques are described in various references, for example, *Microsoft Commerce Solutions* (Microsoft Press 1999); Breedlove et al. *Web Programming* (Sams.net Publishing 1996); and Web-based technical resources published by Microsoft for the .NET technology, currently found under the address: "http://www.microsoft.com/net/", the foregoing hard copy and online publications being hereby incorporated by reference in their entireties. The configuration of the interface may be facilitated by using commercially available publishing tools. Publishing module features and functions generally may include: content (text, image, audio, video, etc.) layout and management for the PP interface; content editing and updating; Web links; publishing to site; password management; security and permission settings; email management; news alerts and notifications; subscription management; message boards, etc.

One suitable web publishing tool is marketed under the name Site-in-a-Box™ and is available from Project A™ of Ashland, Oreg. (www.projecta.com). This publishing tool allows coding to be embedded in the PP interface launched under the launch process described below. Among other things, the tool allows the interface modules to communicate with specific addresses representing Web pages, databases, applications, etc. The following is an example of XML code for rendering the icons, graphics, interactive features, and functions for a four-sided PP interface, and for communication with associated addresses for a module. (Applications may be selected to launch in the ACA or in area of the PP interface.)

```xml
<?xml version="1.0" encoding="utf-8" ?>
<Channel>
    <ZoneTop>
        <BackgroundImage Target="ZoneTop" Image="ZoneTop.jpg"/>
        <Tool Type="AlertBar" Target="ZoneTop" Left="24" Top="0" Red="5" Green="50" Blue="151" TextRed="255" TextGreen="255" TextBlue="255" Interval="2500"/>
        <Image Target="ZoneTop" Image="Right_End_Cap.jpg" Top="0" Left="319" Height="25" Width="12"/>
        <Image Target="ZoneTop" Image="Left_End_Cap.jpg" Top="0" Left="341" Height="25" Width="12"/>
        <Tool Type="ClockBar" Target="ZoneTop" Left="353" Top="0" Red="5" Green="50" Blue="151" TextRed="255" TextGreen="255" TextBlue="255"/>
        <Image Target="ZoneTop" Image="Right_End_Cap.jpg" Top="0" Left="443" Height="25" Width="12"/>
        <Image Target="ZoneTop" Image="Left_End_Cap.jpg" Top="0" Left="464" Height="25" Width="12"/>
        <Tool Type="NewsBar" Target="ZoneTop" Left="476" Top="0" Red="5" Green="50" Blue="151" TextRed="255" TextGreen="255" TextBlue="255" Interval="15000"/>
        <Image Target="ZoneTop" Image="Top_Right_Corner.jpg" Top="0" Left="766" Height="25" Width="10"/>
    </ZoneTop>
    <ZoneTopLeft>
        <BackgroundImage Target="ZoneTopLeft" Image="ZoneTopLeft.jpg"/>
    </ZoneTopLeft>
    <ZoneLeft>
        <BackgroundImage Target="ZoneLeft" Image="ZoneLeft.jpg"/>
        <Image Target="ZoneLeft" Image="Left_Buttons_Top.jpg" Top="0" Left="0" Height="7" Width="25"/>
        <LaunchButton Type="BrowserLink" Target="ZoneLeft" Image="Left_buttons_off.jpg" Rollover="Left_buttons_on.jpg" Top="7" Left="0" Height="20" Width="25" Link="http:/www.projecta.com"/>
        <LaunchButton Type="BrowserLink" Target="ZoneLeft" Image="Left_buttons_off.jpg" Rollover="Left_buttons_on.jpg" Top="27" Left="0" Height="20" Width="25" Link="http://www.gotdot.com"/>
        <LaunchButton Type="BrowserLink" Target="ZoneLeft" Image="Left_buttons_off.jpg" Rollover="Left_buttons_on.jpg" Top="47" Left="0" Height="20" Width="25" Link="http://www.asp.net"/>
        <LaunchButton Type="BrowserLink" Target="ZoneLeft" Image="Left_buttons_off.jpg" Rollover="Left_buttons_on.jpg" Top="67" Left="0" Height="20" Width="25" Link="http://www.google.com"/>
        <LaunchButton Type="BrowserLink" Target="ZoneLeft" Image="Left_buttons_off.jpg" Rollover="Left_buttons_on.jpg" Top="87" Left="0" Height="20" Width="25" Link="http://www.yahoo.com"/>
        <Image Target="ZoneLeft" Image="Left_Buttons_Bottom.jpg" Top="107" Left="0" Height="12" Width="25"/>
    </ZoneLeft>
    <ZoneTopRight>
        <BackgroundImage Target="ZoneTopRight" Image="ZoneTopRight.jpg"/>
    </ZoneTopRight>
    <ZoneRight>
        <BackgroundImage Target="ZoneRight" Image="ZoneRight.jpg"/>
        <Tool Type="UserLinkBar" Target="ZoneRight" Top="0" Left="0" Height="200" Width="25" LinkOnImage="Right_Buttons_On.jpg" LinkOffImage="Button_Blank.jpg" Red="5" Green="50" Blue="151"/>
        <Image Target="ZoneRight" Image="Right_Buttons_Bottom.jpg" Top="200" Left="0" Height="12" Width="25"/>
    </ZoneRight>
    <ZoneBottom>
        <BackgroundImage Target="ZoneBottom" Image="ZoneBottom.jpg"/>
        <Tool Type="SearchBar" Target="ZoneBottom" Left="545" Image="SearchButton.jpg" Top="7" Red="5" Green="50" Blue="151"/>
    </ZoneBottom>
    <ZoneBottomLeft>
        <BackgroundImage Target="ZoneBottomLeft" Image="ZoneBottomLeft.jpg"/>
    </ZoneBottomLeft>
    <ZoneBottomRight>
        <BackgroundImage Target="ZoneBottomRight" Image="ZoneBottomRight.jpg"/>
    </ZoneBottomRight>
</Channel>
```

The example modules or channel objects represented in the foregoing XML code are as described below. Each object is an independent unit Channel Publishers choose what application objects they want on their channel. The Channel Publisher is an administrator or publisher that manages content for a channel. The publisher typically uses a publishing tool, such as the Site-in-a Box publishing tool, to publish content to a target audience. A channel is a content set aggregated by a particular party publishing or controlling content for viewing on the PP Interface. The PP Interface may include a mechanism for changing channels.

LaunchButton

The Channel Publisher will hard code the link locations using Launch Buttons. For example, the Channel User will simply click on links to quickly access any location the Channel Publisher deems is relevant to their Channel Users. These launch locations can be files, applications, web sites and locally stored content UserLinkBar Users can Drag and Drop personal files, folders, URLs onto the UserLinkBar. These are persistent no matter what channel the user is viewing. When the user clicks on a button that has a link associated with it, it launches the link.

SearchBar

This is a direct link to a search engine, and the example demonstrated is Google™. When the user enters information into the Search field and clicks on the action button (in most cases named search) Google.com is searched and presented in the web browser.

Alertbar

This tool is written to receive feeds from an alert tool that may be included in a publishing tool, such as the Site-in-a-Box alert tool. The Channel Publisher inputs information into the web based secure form and all channel users will automatically see the alerts.

ClockBar

Displays the current time. Custom versions of this tool can be created to offer a different visual experience for telling the time, and other custom time or timing related functions may be incorporated as a result of client requirements or sponsor specific features.

NewsBar

This bar receives news from a news source, such as news published with the Site-in-a-Box news publishing tool for that channel. The Channel Publisher inputs news into the publishing tool, such as the web-based, Site-in-a-Box publishing tool, and the news is automatically distributed to all channel users. RSS news feeds, for which there are an abundance of worldwide web resources, may be selected by the user and added to a list of news resource options in a preferences list associated with the PP's news module. The user can switch between those resources without leaving or effecting the current PP Channel.

Background Image

This tool loads an image onto the PP Interface and, for example, is used for tool masking or bump graphics next to tools to make them look better.

AdBar

This tool loads images for banner ads or messages on the PP Interface. For example, the user will click on the ad and be taken to the offer page on the web.

FlashBar

This tool loads animation objects into the PP Interface. These animation objects, can, for example, be based on Macromedia™ flash objects. Such objects can perform functions when clicked on and can now receive information from the database resources associated with that object.

Modules or channel objects called through the XML code above may be written in C# and VB.net.

In addition to the foregoing, there are any number of other objects or modules that may be rendered or embedded in a PP Interface. For example, the PP Interface could include an "Aggregation Agent" that aggregates nonparticipating sites into a single channel or zone of an existing channel. The aggregated content can be integrated with an Alert Agent to notify and present users new content according to user profiles, preferences, or selections. In another contemplated embodiment, Web Services, such as third party ASPs, customer support centers, or other third party services authorized by a Channel Publisher, are published and find a persistent home on users' desktops. In yet another contemplated embodiment, ISPs will provide application objects that show connected or not status indicators and activity indicators as part of an ISP 'Gateway' between the user and the Internet.

Figure 11:
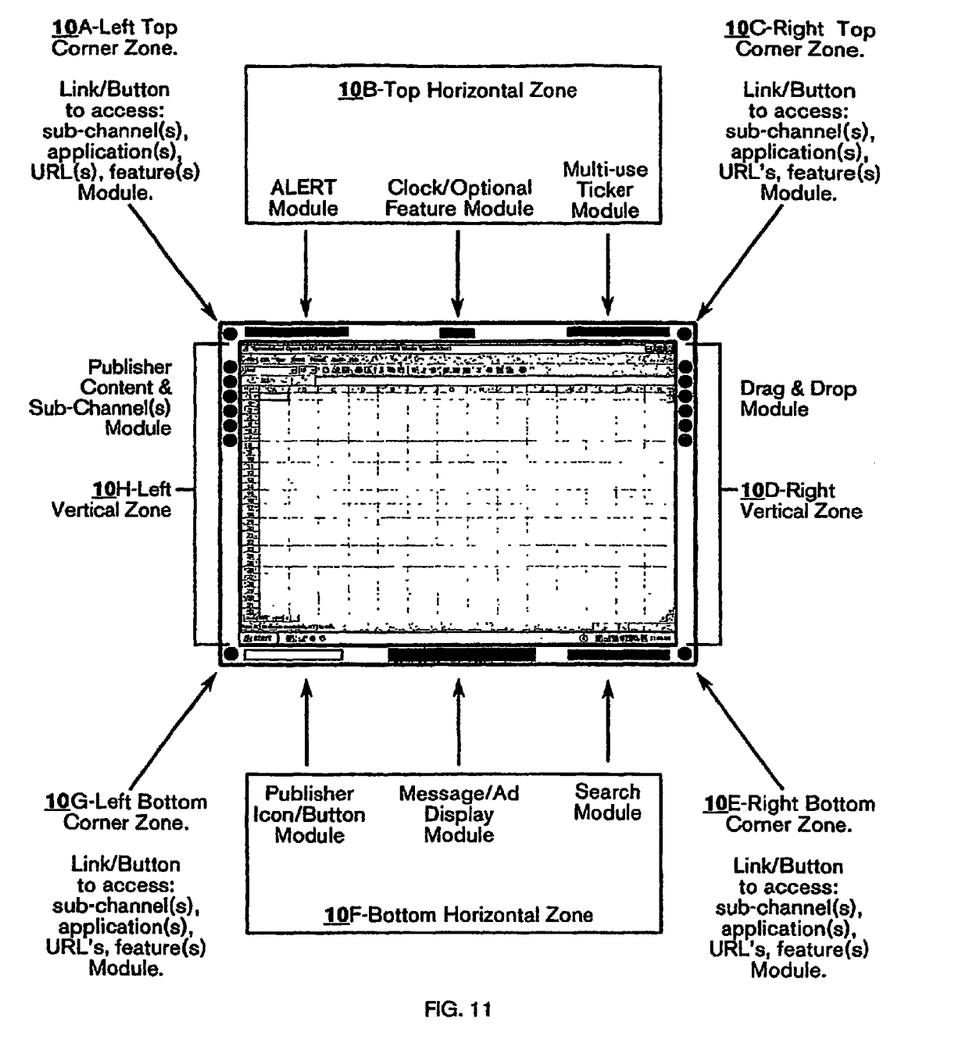
FIG. 11 illustrates a computer display with a PP interface having zones populated with modules, according to the present invention.

FIG. 11 illustrates how the embodiment of FIG. 5 might appear after icons and graphics are added through publishing and content delivery functions described below.

For example, a first zone 10a represents Top Left Corner Zone. This zone includes a Primary Sponsor Icon that functions as a link to the Sponsor website, or if authorized by the Channel Publisher, provides the Sponsor with a fully functional Sub-Channel for delivery of proprietary content to the subscribers of this Channel.

A second zone 10b represents Top Horizontal Zone. This zone includes an ALERT Module, a Clock/Timer Module, and a News Ticker Module.

A third zone 10c represents Top Right Corner Zone. This zone includes an access button to the users' preference settings where options are available for customizing the user experience and PP skins.

A fourth zone 10d represents Right Vertical Zone. This zone includes Drag and Drop Module, which allows user to apply whatever access function they desire to the buttons by simply dragging and dropping a file or button to one of the PP buttons already on this Zone. An example of this is dragging and dropping the Application icon for Microsoft Excel™ to one of the receiving buttons in this module. Once activated, the user may simply click that button to open Excel inside the reduced ACA window of the PP Interface. The user is able to work in this application while the PP interface is present and functioning. The PP interface does not impede or obstruct the use of Excel in this example because the application is fully visible and functional inside the reduced ACA window of the PP.

A fifth zone 10e represents Bottom Right Corner Zone. This zone includes access button to a Channel Publisher's or other content manager sub-channels or link to its website for the purpose of obtaining updates and new downloads or offerings.

A sixth zone 10f represents Bottom Horizontal Zone. This zone includes a search engine feature, a display for rotating ad banners or messaging, and the Brand or Co-Brand icon of the Channel Publisher.

A seventh zone 10g represents Bottom Left Corner Zone. This zone includes a button providing access to a Sponsor site or Sub-Channel, or access to a proprietary feature or function of the Channel.

And an eighth zone 10*h* represents Left Vertical Zone. This zone includes access controls to the specific content that the Publisher Channel is delivering on a regular basis to their subscribers. Content and features in this area can be departmentalized or assigned to specific themes or topics and with other features and applications associated to these departments.

It should be appreciated that any given graphical or interactive button, link or content feature may represent more than one function. For example, an entertainment button when activated by a user could not only link to websites for delivering audio content through the audio system of the user's, but also activate a real media player that could record the content The button may also change form to alert the user of some predetermined event, such as the availability of a new release from the user's favorite recording artist. The alert could be in the nature of the visual or audible cues associated with the button or icon, such as flashing or beeping or the opening of a program or window displaying alert information.

Persistent Portal Launch Process Description

Application Launch Flow

Figure 1:
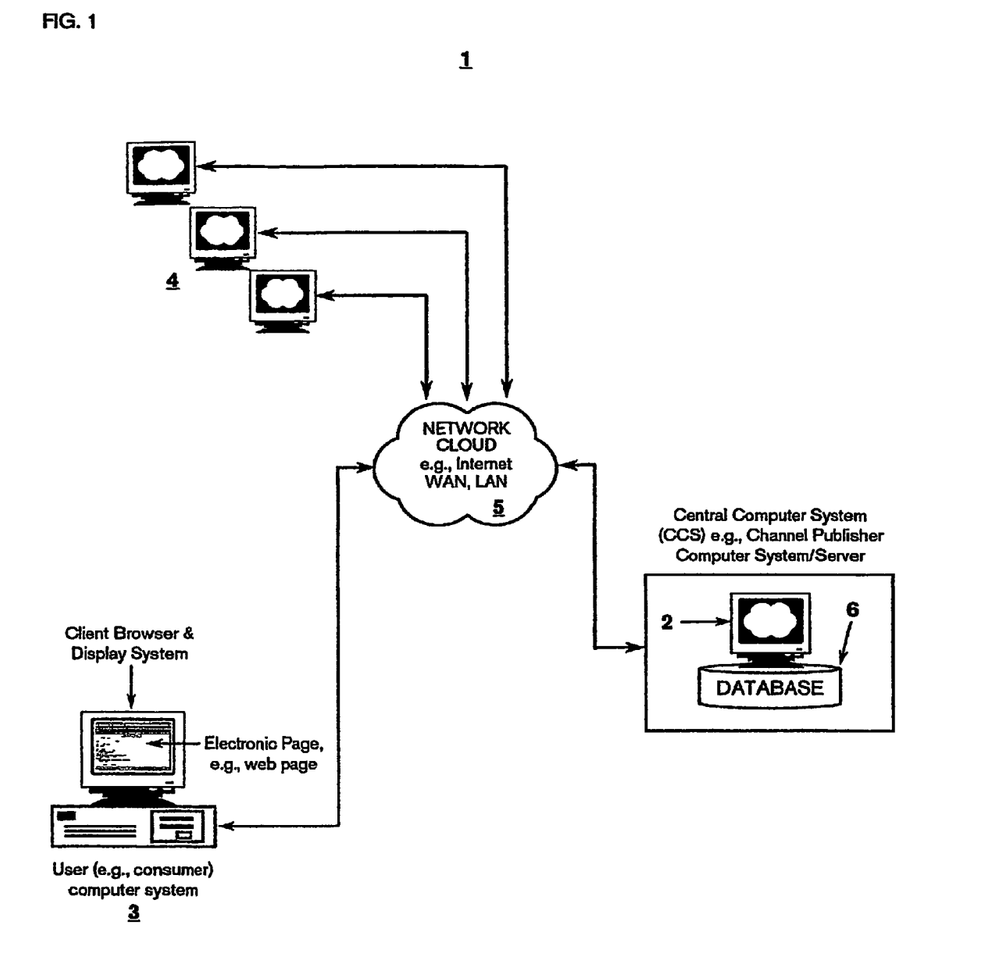
FIG. 1 shows a system of two or more computers for implementing the present invention

The PP application launch process is described in the flowchart of FIG. 1.

Load

This is done one of two ways. The Application by default loads at startup. It can also be run by double clicking an icon for the PP interface application. This application is designed to work on Microsoft Windows 2000, Microsoft XP and Microsoft Windows Server 2003. However, the present invention may be implemented with other operating systems using analogous features in such operating systems or as otherwise will be recognized by persons skilled in the art. Other current suitable operating systems include Linux and Mac.

Show 'About' Box

While the application is loading this is shown to give the user feedback on the load process as well as other predetermined information, such as proprietary notices. Links on the splash screen also allow you to link to predetermined support sites (e.g., WWEyes.com, ProjectA.com, incident tracker for support).

Is Dot NET Framework Loaded?

In the Microsoft Dot NET environment, the Dot NET framework 1.0 or later is required. If the framework is not previously installed on user's system, the framework may be provided by conventional means. For example, when the user goes to their Channel Publisher's site to download the software for the PP Interface, they will be sent first to the .NET download via a provided link. If the framework is not loaded, the system presents the end user with an error message telling them to install Dot Net first. This should only happen if they uninstall the framework after installing the app, because the app install won't work unless the framework is installed.

Tell OS Desktop is Smaller

Check the Windows Desktop size. Using the System calls (SystemParmaetersInfo, EnumWindows, GetDesktopWindow, SendMessage, MoveWindow) Set the Windows Desktop Size to the innerbounds of the PP interface.

Refresh the Desktop

Tell Windows that the screen needs to be refreshed. This redraws the desktop and refreshes all open windows. Send the same command that the desktop resize sends, this will redraw the icons on the desktop and reset all windows sizes.

Draw the EyePortal™ Window ("Blanked Space")
  Load the window.
  Set the internal frame to transparent (Reduced Desktop Display Area)

Get User Info (ID)
  User email Address
  User Default Channel
  User QuickObject Settings Load Default Channel
  Load the 8 objects for each window in the default channel file.
  Is Internet access available?

Upload User Access Info (Date, Time, Channel ID, User ID)
  The following are an example set of features or functions that may be provided through the PP:

Get XML/RSS News
  Call the News Service for the Channel. The service will return news from an RSS resource as an XML file and store it locally. News is stored in a database and contains a headline with a link to the news article if the end user clicks on the news. RDF Site Summary (RSS) is a lightweight multipurpose extensible metadata description and syndication format RSS is an XML application, conforms to the W3C's RDF specification and is extensible via XML-namespace and/or RDF based modularization.

Get XML Alerts
  Call the Alerts service for the Channel. Alerts are maintained using the Intranet The Alert object reads for new alerts at startup and then again every 15 minutes or at any predetermined timed interval.

Get Channel Links
  Channel links are loaded in from a local XML file.
  Channel links managed by the Channel Publisher are not editable by the Channel User.
  Channel Links can be modified by sending a channel update out.

Get Channel Banner Ads/Messages
  Channel Banners are loaded in from the local XML file.
  The ads or messages link out to websites.
  Banner ads and messages can be modified by sending out a channel update.

Load Other Channel Index
  Channels are stored in an XML file. The system walks through the XML file and creates an index menu to allow for all the end users to choose between channels. In the present invention, the user may right click on the Left Vertical Zone of the PP and select a new channel from the index menu Future embodiments will incorporate a separate Channel Selector Control Button displayed on the PP interface itself and will open a Channel Selector Control Strip or Menu Window for this purpose.

Load User Links
  User links are links set by the end user through a drag and drop interface.
  These are modifiable by the end user and remain consistent between channels (as far as links go but not as far as location or look and feel)

Set Clock
  Set the clock to that found in the system.
  Future updates will allow for multiple time zones to be online at the same time.

Load Complete—Wait for User Interaction

The Channel is the pipeline between the user and the Publisher through which the content, alerts, etc., are delivered The PP interface is a receiver of a Channel . . . or multiple Channels. If a user is subscribed to 2 Channels, they can change the Channel and the new Channel's Skin appears on the PP interface. The Drag and Drop module remains the same functionally . . . just the look changes to coincide with the look of the new Channel. The Channel change process should probably be described . . . I have placed a call to Jim to discuss this so I get it right the first time.

Other Contemplated Features of the Present Invention:

Font control on EyePortal™ objects—allowing more options to be implemented without excessive graphic limitations involving use of Fonts on icons or in tickers and alert window.

Remember last searches in search engine empowered object

Flash Objects that read from XML file—allowing use of flash animations for skins, buttons, icons and graphic elements of the PP skins and controls.

Alert Queue: The PP interface may include multimedia features, such as animations or audio for notifying users of alerts.

Alert Notification Service: sending a notification back to the Channel Publisher or user that tells them who has received an alert and when as a 'return receipt'.

Alert Logging: System logs alerts, including where alert originated, time and date, nature of alert, etc.

Alert Migration: Regardless of which Channel is active at any given time, predetermined priority alerts corresponding to and deployed by other Channels will migrate to the Alert Module of the currently visible Channel. It is not necessary for the user to change the current Channel to receive the Alert and its information.

Sub Channels: Allows more than just the main Channel Publisher to develop content and deliver to the PP interface. An example would be: The UNLV Alumni (Primary Channel Publisher) would allow the UNLV School of Business to send their own content directly to the UNLV Alumni that are Business School Grads. It is the Alumni interface, but the Business School would have a Sub-Channel button to deliver their content to. The Database of subscriber profiles would identify the correct recipients for that content.

Windows 98, ME may have conflicts with transparent objects, which can be overcome with appropriate modifications to a special edition PP Interface:

Auto Hide, Auto Show (application list): PP Interface responds to the auto hide/show mode of Windows Start Bar by adjusting the position it occupies accordingly so that Start Bar is not obscured by the interface.

Computer Implementation

The methods and systems of the present invention may be stored in or implemented through computer-readable medium associated with a single general-purpose digital computer system or a distributed or networked computer system, the program comprising executable instructions for performing various functions. Looking more particularly at the systems and methods for implementing the present invention, FIG. 1 shows an overview of a system 1 of a plurality of networked computers, according to the present invention System 1 may include a Central Computer System ("CCS") or central server 2, such as may be controlled by organizations or institutions sponsoring a PP (e.g., a Channel Publisher's computer system); one or more user or client computer hosting software for a PP interface user computer systems 3; and a second set of computer systems 4 that supply content directly to user computer systems 3 or indirectly through CCS 2. The CCS 2 would typically implement, host, and/or execute one or more features of the present invention relating to administration of the user computers 3. For example, the CCS 2 may receive data, such as user profiles or settings, such as content preferences for users; download the PP interface software, updates, patches, upgrades, and etc. to user computers; deliver content to user computers; execute functions for users or user computers, i.e., perform as an Application Service Provider, (ASP); or provide data storage services for users. Computer systems in system 1 may be networked over LANs, WANs, VPNs, the Internet or other known network systems using known protocols for such systems, including TCP/IP, as well as other modes of digital data communication.

Figure 2:
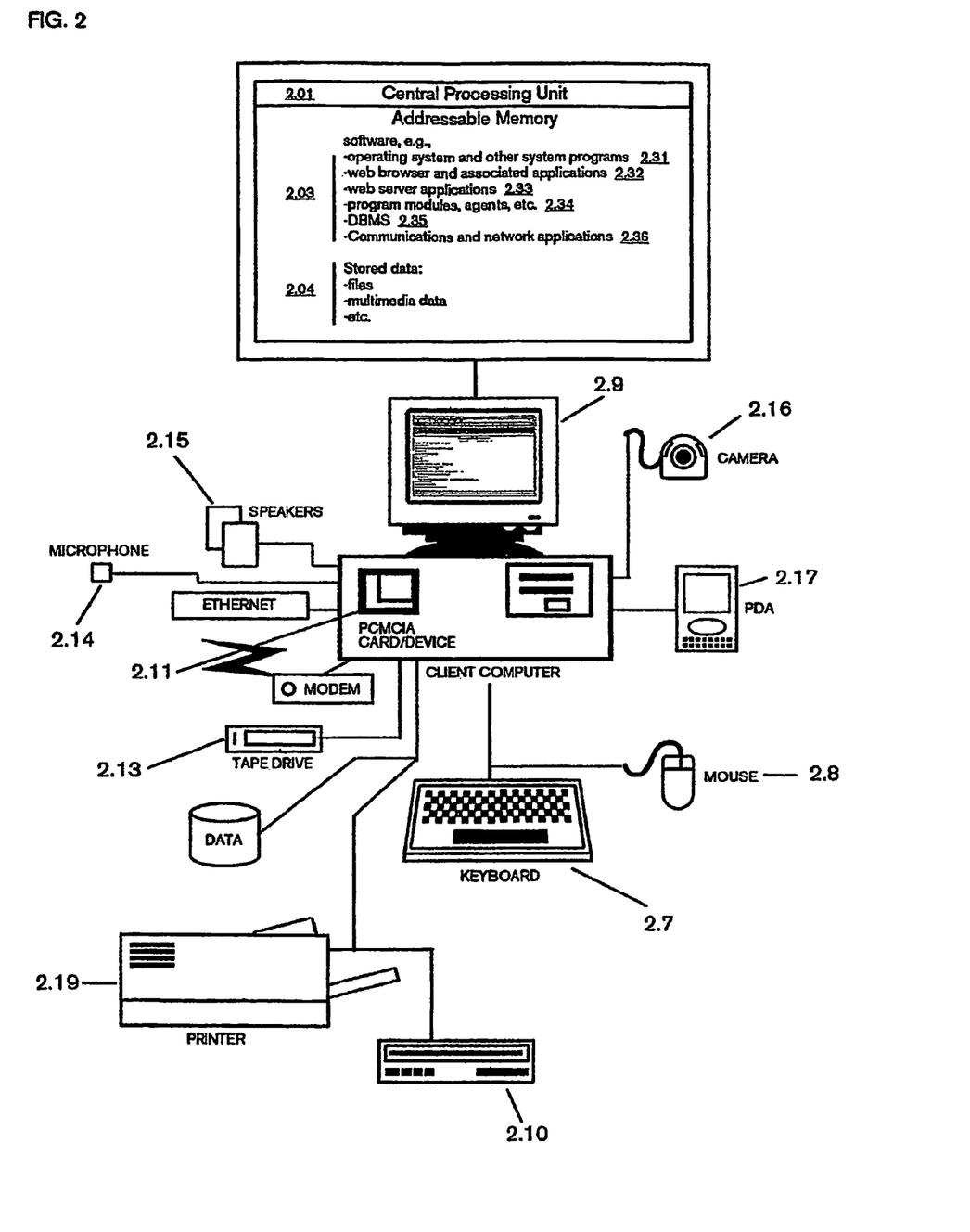
FIG. 2 shows an example computer and example peripherals for use in the present invention.

FIG. 2 illustrates features that may be typically found in a computer system 2, 3, or 4 in system 1 of FIG. 6. As used herein "computer" or "computer system" generally means a set of hardware and software components as is known in the art. For example, a computer may be a desktop, server, laptop, PDA, mobile phone, thin client or terminal implementing the PP software for a user. A computer system 2, 3, or 4 generally includes: central processing unit ("CPU") 2.01; memory (ROM and RAM) 2.02, e.g. a hard disk drive and associated RAM devices; programs 2.03 in memory, including operating system 2.31, web browser applications 2.32 and/or web server applications 2.33, user applications (modules or agents) 2.34, database management system (DBMS) 2.35, communications and network applications 2.36, e.g., email, and network interface systems. Memory 2.02 would also include stored data 2.04.

A computer system may include one or more of the following input/output devices: keyboard 2.7, mouse 2.8, display monitor 2.9, read/write drive 2.10 for removable media, e.g., DVD drive, PCMCIA card 2.11, modem 2.12, backup storage device 2.13, e.g., tape drive, audio capture device 2.14, e.g., microphone, audio output device 2.15, e.g., stereo speakers, still or motion image capture device, e.g., camera 2.16, and an associated computer device for data upload or download, e.g., PDA 2.17, and/or a printer 2.19. It will be understood by persons skilled in the art that a computer system 2, 3, or 4 may also be in the form of a Personal Digital Assistant (PDA), mobile communications device with computing functions, a wireless computer system or device capable of communications over the Internet or other network, or a computer terminal (thin client) or Internet appliance capable of such network communications.

A computer system 2, 3 or 4 in system 1 may be in the form of a distributed system not, under a single housing or roof, but having the distributed components logically coupled and under the operational control of a party.

Computer systems of system 1 may execute a conventional operating system 2.31, including, but not limited to, Microsoft Corporation's Windows™ 3.x, 95, 98, 2000, ME, XP, NT or DOS operating systems; Linux operating systems; Sun Microsystems' Unix Solaris operating systems; IBM's AIX Solaris operating systems; SGI's IRIX Solaris operating systems, Apple OS, BE OS or other operating systems, including, but not limited to Window's CE, Palm OS, etc. for PDAs, cellular devices, web devices, or other computing devices. The possible software components of a computer system 2, 3 or 4 described herein, including operating system and application software, may reside on one or more hardware components providing addressable memory for the computer system.

Data and information may be formatted by a computer in system 1 for printing, viewing, transfer to another computer system, storage in any of many known formats including Adobe PDF; rich text (RTF); SGML formats including HTML, DHTML, XHTML, and XML; ALLAIRE Cold Fusion CFML; MICROSOFT ASP; JAVA Script MICROSOFT Word, Excel, Access; bitmap, JPEG, GIF, and other graphics file formats. It could also be presented in known audio or video formats, such as WAV, MPEG, and MP3 formats.

The electronic data files may be served via known protocols, such as TCP/IP. As used herein, "Web documents" generally means electronic documents that may be presented through conventional web browser applications such as the INTERNET EXPLORER series of web browser applications by Microsoft Corporation, or the NETSCAPE COMMUNICATOR series of web browsers by Netscape Communications Corporation The PP interface may be implemented with browser functionality to receive and render Web documents through designated channels or interface features to the same extent as conventional browsers.

The client computers with PP interfaces communicate with servers that provide content, data, PP software or administrative updates. The server side may be based on a general Web server configuration The servers may be scaled in size or number to meet demands (storage or processing power or bandwidth) of client computer systems. The administrative functions may include the following two components: (1) a management function for managing general server and system functions and (2) content management function for creating or publishing content for or delivering it to client computers.

Generally, the architecture of the server set-up or administrative features may be setup and configured by persons skilled in the art. In context of the present invention, the system includes the particularized architecture that enables the PP interface to accept the 'feed' of content, etc., from a server as a result of the client deploying content by using the publishing tools for that purpose and the user's PP software checking in with the server regularly for updates and alerts.

The computer systems suitable for use may include or otherwise be directly associated with a web server and associated database. As used herein, a web server generally refers to a computer system that hosts software that enables access by client computer systems or terminals via the Internet or other network transport. The web server may permit one or more of the following: presentation of data and information, typically in the form of web documents or streaming media; data and information storage and transfer; and other transactions or processes that are capable through web servers. Suitable web server software is widely available and includes Apache Software Foundation's Apache Server web server; Netscape's FASTTRACK series web server, Microsoft Corporation's Internet Information Server, IBM's WebSphere, and Sun Microsystem's JAVA WE SERVER A web server in CCS 2 may run appropriate scripts to capture data, to process captured data, or to present processed data. A web server of CCS 2 may receive into or present data from an associated database or other data source to remote computer systems 3, 4, or other remote system, over a network 5. The data may be presented in any known format or mechanism, including HTML, XML, PDF, CFML, MICROSOFT ASP, and as graphic, audio, video and multimedia formats, and others.

A computer of system 1 may include various external interface applications for converting incoming data, such as form data, to a format for communication with the respective application module or database. The system may also include various external service modules for obtaining information in a format required by the external service. The system may also include a notification module. This module handles notification and electronic mail communication with client systems. The system may include a database interface module. This module handles all interface requirements between application modules and servers or databases. For example, the database interface application manages (a) the simultaneous connections to the database such that the total number is maintained within applicable license agreements; and (b) any integrity problems in interactions between application modules and the databases. Thus, this module allows the system to be connected to different types of databases such as relational databases or object-oriented databases. Another function that may be included in the system is a consumer profile/settings module. This module receives the consumer profile and settings data sent to the system and performs intake operations on the data so that it may be used in other modules or assigned to databases.

The present invention contemplates that computers in system 1 may be used to create and manage database records, input and manage data, upload files, communicate, compute data, collaborate, and exchange things with each other through their respective computer systems. The data and files may be transferred or presented to computer systems by participating parties via user interfaces developed in Standardized General Markup Languages (SGML), scripting languages, and other known languages or protocols. Such languages and protocols include MICROSOFT ASP, CFML, JAVASCRIPT, JAVA, COM, CGI, HTML, DHTML, XHTML and/or XML. To provide the foregoing functionality, the user interfaces would typically be in the nature of electronic documents such as web documents or email documents that, through appropriate computer code from such languages, are associated with databases, web servers, web browsers, file servers, network communications links, email programs, etc. The electronic or Web documents transferred to or from the PP could be static documents stored on a server or database or documents created dynamically through server function calls, for example.

Databases may be based on any number of known DBMSs, including hierarchical databases, network databases, relational databases, and object-oriented databases. Suitable DBMSs are widely available and include Oracle, Sybase, Microsoft SQL Server, open source MySQL, and DB2. One suitable database system is a relational database based on Structured Query Language (SQL). A suitable SQL database would typically include a Data Definition Language (DDL) for creation of a new database and new objects within an existing database; a Data Manipulation Language (DML) for processing existing database objects; and a Data Control Language (DCL) for administering permissions and other security-related issues. The data processing is handled by a database engine and can be accessed by various querying means, including Boolean logic evaluation, proximity calculations, and fuzzy logic evaluation. The search engines and databases of the present invention may also be custom designed, the design process and features being well within the skill of persons in the art. U.S. Pat. No. 5,983,220 of Schmitt, entitled "Database Evaluation System Supporting Intuitive Decision in Complex Multi-Attributive Domains Using Fuzzy, Hierarchical Expert Models" discloses, among other things, systems and methods for constructing and querying databases and returning and presenting results of database queries. The '220 patent is hereby incorporated by reference for all that is disclosed therewithin as if set forth herein in its entirety.

It should be understood that the foregoing description is only illustrative of the invention. Various alternatives and modifications can be devised by those skilled in the art without departing from the invention Accordingly, the present invention is intended to embrace all such alternatives, modifications, and variances that fall within the scope of the appended claims.

It should be understood that the foregoing description is only illustrative of the invention. Various alternatives and modifications can be devised by those skilled in the art without departing from the invention. Accordingly, the present invention is intended to embrace all such alternatives, modifications, and variances that fall within the scope of the appended claims.

While the inventor understands that claims are not a necessary component of a provisional patent application, and therefore has not included detailed claims, the inventor reserves the right to claim, without limitation, at least the following subject matter.

I claim:

1. A method of proportionally reducing the size and area of an operating system's active content area of a desktop display with all functions operational, while maintaining a complete, intact view of the desktop (display intact) including the functional controls that provide access to resident applications and documents, comprising:
   deploying a two dimensional persistent portal graphical user interface, each dimension having a number of pixels, into a blanked area resulting from the proportionate reduction in the active content area, comprising:
   a. adjusting parameters for the desktop display area residing inside of, but not including an overseen border, by a number of pixels that equals the required area to be occupied by the persistent portal interface when deployed;
   b. addressing the operating system settings for a video mode or monitor resolution for said required pixels within said active content area to facilitate activation of features and functions of the operating system; and
   wherein the persistent portal interface interacts with the operating system to facilitate activation of features and functions of the operating system.

2. A computer-executable program stored in a tangible, computer-readable medium for interacting with an operating system's active content area of a desktop display area inside of, but not including, an overscan border, the program comprising:
   executable instructions for dividing the active content area into a persistent portal interface area and a proportionally reduced display area without altering or interacting with the overscan border area wherein the persistent portal area comprises a blanked area resulting from the proportionate reduction in the display area, the blanked area being provided by executable instructions for addressing the operating system settings for a video mode or monitor resolution for a required number of pixels for the blanked area;
   executable instructions for displaying the persistent portal interface in the persistent portal interface area, and enabling the persistent portal interface to interact with the operating system to facilitate activation of features and functions of the operating system; and
   executable instructions providing for proportional reduction of the display area into the proportionally reduced display area.

3. The program of claim 2 wherein the executable instructions for dividing the display area address an operating system's settings of a video mode.

4. The program of claim 3 wherein the area occupied by the operating system's graphical user interface is the area displaying a Windows Start Bar.

5. The program of claim 2 wherein the display area inside of, but not including, an overscan border comprises an area occupied by the operating system's graphical user interface and an area left by the operating system unoccupied by the operating system's graphical user interface.

6. The program of claim 2 wherein the display area inside of, but not including, an overscan border comprises an area left by the operating system unoccupied by the operating system's graphical user interface but does not include an area occupied by the operating system's graphical user interface.

7. The program of claim 6 wherein the area occupied by the operating system's graphical user interface is the area displaying a Windows Start Bar.

8. The program of claim 6 wherein the area occupied by the operating system's graphical user interface is disposed between the persistent portal interface area and the overscan border.

9. The program of claim 8 wherein the area occupied by the operating system's graphical user interface is the area displaying a Windows Start Bar.

10. The program of claim 2 wherein the executable instructions for displaying the persistent portal interface displays the persistent portal interface area visible and operational.

11. The program of claim 2 wherein the proportionally reduced display area is reduced both vertically and horizontally.

12. The program of claim 2 further comprising executable instructions for providing a movable pointer that functions within the display area for the purpose of user input causing interaction and command response from the program.

13. The program of claim 2 further comprising executable instructions for writing an image of the persistent portal interface area to video display memory.

14. The program of claim 2 wherein the persistent portal interface area is disposed along at least two adjoined sides of the display area.

15. The program of claim 2 wherein the persistent portal interface area is disposed along at least three adjoined sides of the display area.

16. The program of claim 2 wherein the persistent portal interface area is disposed along at least four adjoined sides of the display area.

17. The program of claim 2 wherein the persistent portal interface area includes at least two zones.

18. The program of claim 2 wherein the persistent portal interface area has one or more zones, each zone having one or more modules of features and/or functions.

19. The program of claim 2 wherein the user interface has at least two of the following modules: Sub-Channel Modules, Sponsor or 3rd Party Icon/Access Modules, Custom Application Modules (Client Customization), Network Preferences and Updates Module, Publisher Preferences Module, Personal Tools Applications Module(s), Application Service Provider (ASP) Products Download Module, and Entertainment Module (games, music, video and pay-per view events).

20. The program of claim 2 wherein the user interface has at least three of the following modules: Sub-Channel Modules, Sponsor or 3rd Party Icon/Access Modules, Custom Application Modules (Client Customization), Network Preferences and Updates Module, Publisher Preferences Module, Personal Tools Applications Module(s), Application Service Provider (ASP) Products Download Module, and Entertainment Module (games, music, video and pay-per view events).

21. The program of claim 2 wherein one or more modules receives and interacts with content received over a data network.

22. A computing device for interacting with an operating system's active content area of a display area inside of, but not including, an overscan border, the device comprising:

means for dividing the active content area into a persistent portal interface area and a proportionally reduced display area without interacting with or altering the operating system's overscan border area, wherein the persistent portal area comprises a blanked area resulting from the proportionate reduction in the display area, the blanked area being provided by executable instructions for addressing the operating system settings for a video mode or monitor resolution for a required number of pixels for the blanked area;

means for displaying the persistent portal interface in the persistent portal interface area, wherein the persistent portal interface interacts with the operating system to facilitate activation of features and functions of the operating system; and means for proportional reduction of display area into the proportionally reduced display area.

* * * * *